Dec. 1, 1925.
W. R. HAMILTON
1,564,063
MECHANICAL RECTIFIER
Filed July 18, 1923    2 Sheets-Sheet 1
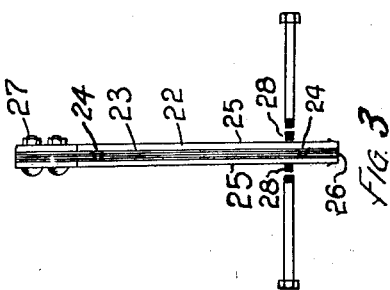
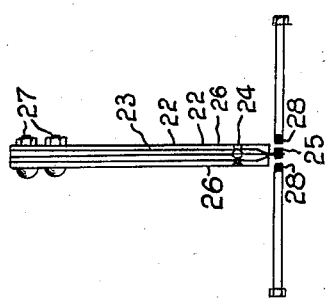
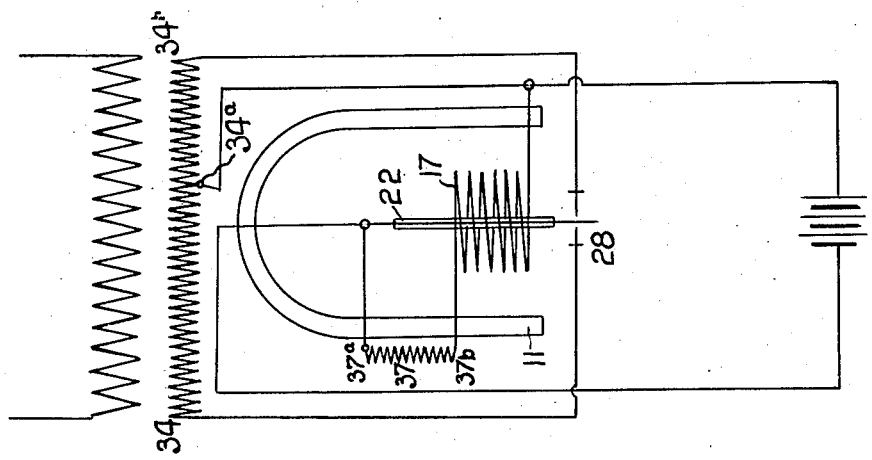
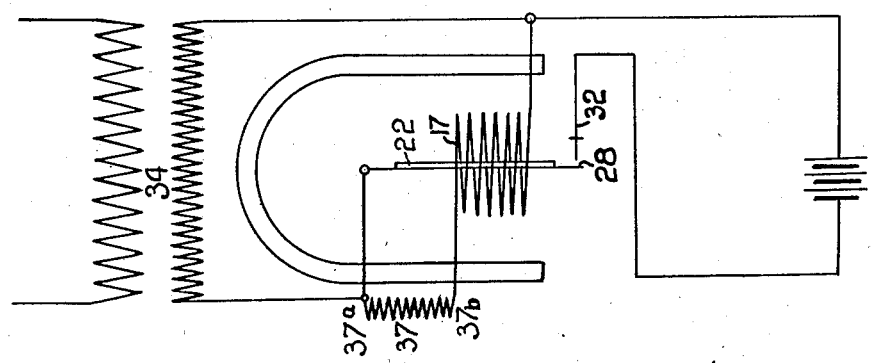
INVENTOR
WILLIAM. R. HAMILTON
By Featherstonhaugh & Co.
ATTYS.

Dec. 1, 1925.

W. R. HAMILTON

MECHANICAL RECTIFIER

Filed July 18, 1923

INVENTOR
WILLIAM R. HAMILTON
BY Featherstonhaugh & Co.
ATTORNEYS

Patented Dec. 1, 1925.

1,564,063

UNITED STATES PATENT OFFICE.

WILLIAM R. HAMILTON, OF MONTREAL, QUEBEC, CANADA, ASSIGNOR TO DOMINION MESSENGER AND SIGNAL COMPANY LIMITED, OF TORONTO, ONTARIO, CANADA, A CORPORATION OF CANADA.

MECHANICAL RECTIFIER.

Application filed July 18, 1923. Serial No. 652,428.

*To all whom it may concern:*

Be it known that I, WILLIAM R. HAMILTON, a subject of the King of Great Britain, and resident of the city of Montreal, in the Province of Quebec and Dominion of Canada, have invented certain new and useful Improvements in Mechanical Rectifiers, of which the following is a full, clear, and exact description.

This invention relates to mechanical rectifiers and the object of the invention is to provide a simple, inexpensive and efficient rectifier of the vibrating reed type adapted to the charging of from one to six cells of a storage battery. Another object is to provide a device which can be used to give a continuous floating charge to storage batteries as used in signal and alarm apparatus. A still further object is to provide a device which will operate continuously with the minimum amount of attention and operate for long periods without the necessity of changing the adjustment.

A still further object is to provide a device which will give satisfactory results, irrespective of such variations of frequency and voltage as exist on commercial A. C. power circuits.

In my invention, a small A. C. transformer is used to reduce the A. C. line voltage to such value as will conform to the charging requirements in the diagram, Figures 1 and 2, attached to this specification. The transformer is shown as having a ratio of 110 volts to 15 volts, the primary taking 110 volts and the total output of the secondary being 15 volts. The secondary has a "tap" taken out to give 6 volts, this allows secondary voltages of 6, 9 and 15 to be utilized. This transformer can be connected to charge 3 cells or 6 cells as desired and any commercial type of low voltage transformer of the proper capacity may be used. The current from the 6 volt coil energizes a solenoid which surrounds a laminated armature which is free to vibrate between the poles of a permanent magnet. The poles of the permanent magnet obviously present unlike poles to the sides of the armature and they always remain of the same polarity. The solenoid when energized by the 6 volt alternating current, alternately reverses the polarity of the armature in synchronism with the alternating current. This causes the armature to be alternately attracted and repelled by each pole of the permanent magnet, hence, during one half cycle, the armature will be attracted by the north pole and repelled by the south pole, and during the other half cycle the reverse action will take place. The armature carries a spring upon which is mounted a platinum contact point. This point is arranged to make contact with an adjustable point each time the armature moves in one direction. When two springs and two adjustable points are used, the armature will make contact with each adjustable point alternately. In the diagram, Figure 1, the transformer is shown with one secondary lead connected to the armature and the adjustable screw connected to the battery, while the other secondary lead of the transformer is connected to the opposite pole of the battery. In this manner, only one half of the A. C. wave or cycle is allowed to flow to the battery, while if double contact arrangement is used, the battery is connected to the armature and to the central point of a transformer secondary, giving double the required voltage. The ends of the double secondary are connected to two contact screws and both sides of the A. C. wave are utilized.

In the drawings:

Figure 1 is a diagrammatic view of the rectifier with one spring, one contact point and one adjusting screw.

Figure 2 is a diagrammatic view of the rectifier with one central spring, two contact points and two adjusting screws.

Figure 3 shows a rectifier armature of the double spring, double contact point and double adjusting screw construction.

Figure 4 is a view of an armature for the rectifier, showing the construction of a central spring, double contact point and double adjusting screw arrangement.

Figure 5:
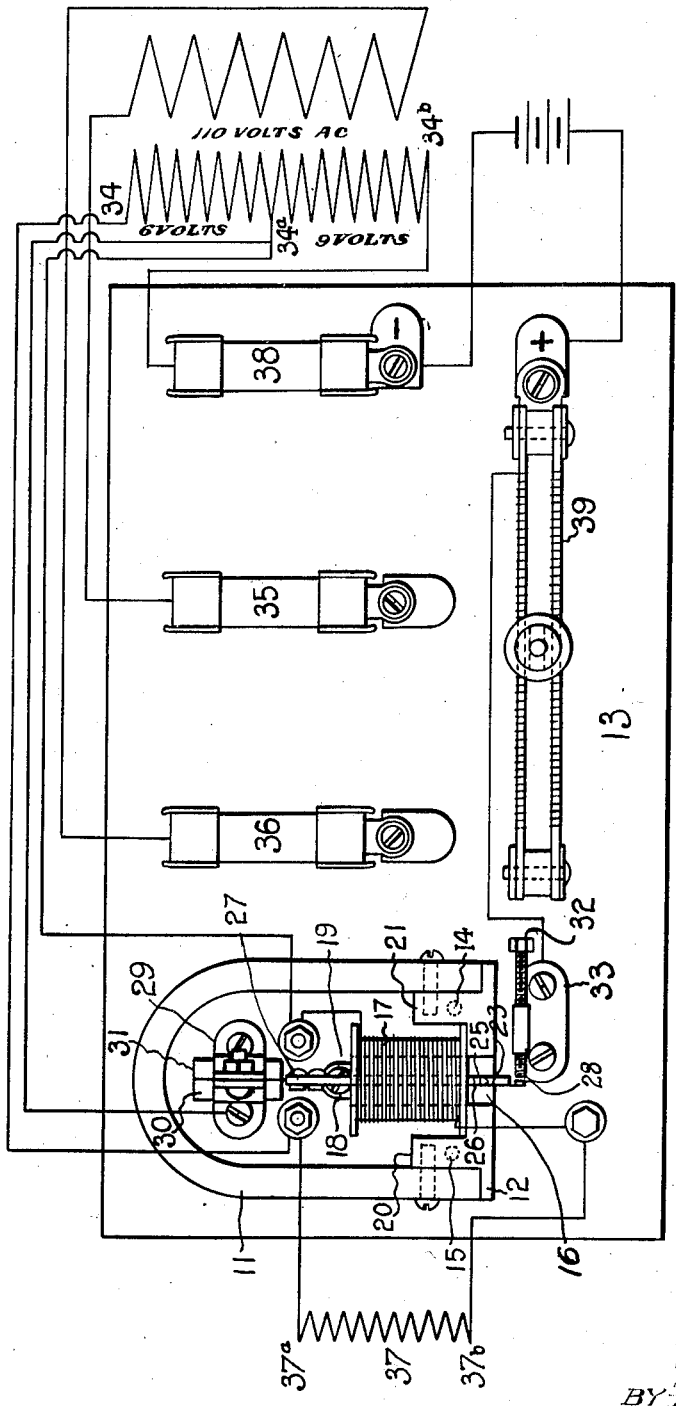
Figure 5 is a diagrammatic assembly drawing of the single contact point, single adjusting and single spring type.
Figure 6:
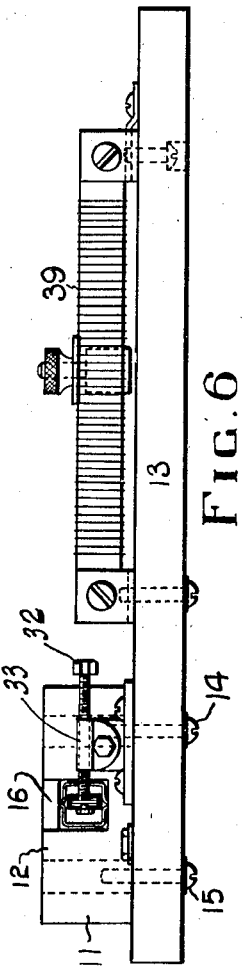
Figure 6 is a plan view of the structure of Figure 5.

Referring more particularly to the drawings, 11 designates a permanent magnet attached to a cast iron yoke 12 which is fastened to a slate base 13 by two screws 14 and 15. The magnetic circuit of the permanent magnet is closed by the yoke 12. The cast iron yoke has a slot 16 milled out of it. A solenoid 17 is attached to the slate base by a screw 18 and by the lug 19 under the cast iron yoke 12. The solenoid 17 fills the gap between the cast iron yoke projections 20 and 21. An armature 22 is built up of the proper number of laminations 23 of transformer iron and one of phosphor bronze to give the necessary weight for a given frequency. These laminations are held together by the rivets 24. A steel spring 25 and a phosphor bronze spring 26 are attached to the armature and are held in place by two screws and nuts 27. A contact point, or points, of platinum or carbon 28 are attached to the contact spring or springs 25. This assembled armature 22 is supported by the two piece bracket 29 and the adjusting bars 30 and 31. It will be noted in Figure 5 that the armature is clamped in the bracket 29 and passes through the solenoid 17 and through the slot 16 in the cast iron yoke 11. The contact spring 25 extends beyond the cast iron yoke and the armature assembly is free to vibrate in the solenoid 17 and the slot 16. The movement of the armature is limited by the contact screw 32 which is held by a contact bracket 33. It will be noted that some of the parts referred to are of peculiar design and in order to complete the description the following details are submitted. The cast iron yoke 12 closes the magnetic circuit of the permanent magnet 11 in order to prevent the strength of the magnet from becoming weakened, as it is well known that a permanent magnet will become demagnetized if the poles are entirely separate and the magnetic circuit left open. This particular device will operate satisfactorily if a square hole is cut in the cast iron yoke instead of the slot. In this latter case the yoke is closed both above and below the magnet. The armature is laminated to enable it to respond to the rapid reversals of current polarity which occur in A. C. circuits and which if a solid armature were used would tend to set up eddy currents, which would have the effect of preventing the armature from following the A. C. current reversals promptly. In other words, this armature being laminated enables it to keep in synchronism with the alternating current. The phosphor bronze lamination on the one side is to maintain the magnetic balance of the armature by practically duplicating the effect of the contact spring on the other side. It will be noted that this armature when at rest is in a neutral field, that is it is half way between the two poles of the permanent magnet and there is therefore no attraction or repulsion effect when at rest. This allows of a minimum of tension to be maintained on the moving element of this rectifier with the obvious result that a minimum of current is required to operate same. This armature can be made extremely light which tends to ensure its ability to follow the rapid fluctuations of the A. C. circuit. As this rectifier is designed for continuous operation without attention, and as under this condition it must start and stop automatically with the alternating current, and without sticking at the contact points, the advantages of this type of construction will be appreciated. A two piece bracket 29 is designed to hold the armature in position while allowing an easy means of adjustment. The clamping nut on this bracket together with the two brass bars 30 and 31 take care of the armature adjustment. By loosening the nut on the bracket 29 and by sliding the adjusting bars 30 and 31 back or forward, the tension of the steel spring 25 which acts as a hinge and tension for the armature may be varied and the periodicity of the armature adjusted without altering the position of the contact points 28. The contact bracket 33 is designed to provide a long clamping bearing for the contact screw 32 which picks up the current from the spring 25. The clearance between these points, when the armature is at rest, is small, and the permanency of this adjustment is an important factor in the operation of the rectifier. It will be seen that this type of bracket forms a rigid support, and gives an extremely satisfactory clamping arrangement for the contact screw. The solenoid 17 is made up of a single brass punching to provide all the necessary lugs to support the two fibre punchings which form the ends of the solenoid and for fastening it to the base. This brass punching, with the fibre ends in place, carries the winding used to operate the device. This construction ensures a permanent opening for the armature to operate in, and one that, owing to its special construction, cannot be misplaced so as to interfere with the operation of the armature. When forming the punching into the square form upon which the winding is placed, an air gap is left along one corner to prevent any damping action. The transformer 34 may be of any standard make of low voltage transformer, giving an output according to the work to be performed, and it may be arranged to give the actual secondary voltage required for any particular charging condition within the limits upon which the rectifier is designed to operate. If a higher secondary voltage is obtained from the transformer than that which the charging conditions call for, a variable resistance may be connected in the circuit, between the storage battery and the rectifier. This resistance will enable the battery to be charged at any pre-determined rate, irrespective of the actual voltage supplied by the transformer. The transformer shown in Fig. 5 is for a 110 volt primary circuit and a 6, 9 and 15 volt secondary circuit. The primary is connected to the 110 volt lighting circuit through the fuses 35 and 36. The solenoid is energized from the 6 volt winding of the transformer, the circuit being from 34 to the fixed resistance 37 at 37$^a$ and from 37$^b$ of fixed resistance to the solenoid 17, and from the solenoid to the transformer 34$^a$. The fixed resistance 37 is connected in series with the solenoid 17 and is adjusted to give the amount of current necessary to operate the rectifier by synchronism with the alternating current at any given frequency. The circuit for the charging current is from the transformer at 34$^b$ to fuse 38, thence to the negative pole of the battery, from the positive pole of the battery to the variable resistance 39, to the contact screw 32, thence from the armature 22 to the transformer at 34$^a$ for a three cell battery or to 34 for a six cell battery.

Having thus described my invention, what I claim is:

In a device of the character described, the combination of a U-shaped permanent magnet with a cast iron yoke which bridges the poles of said magnet, completely closing the magnetic circuit, said yoke being provided with a slot extending partially therethrough, a solenoid supported between the legs of the magnet and an armature passing through the solenoid and through the slot in the yoke.

In witness whereof, I have hereunto set my hand.

WILLIAM R. HAMILTON.